United States Patent
Seong (10) Patent No.: US 10,809,188 B2
(45) Date of Patent: Oct. 20, 2020

(54) APPARATUS AND METHOD FOR WATERPROOFING TEST OF VEHICLE

(71) Applicants: HYUNDAI MOTOR COMPANY, Seoul (KR); KIA MOTORS CORPORATION, Seoul (KR)

(72) Inventor: Ha Seung Seong, Daejeon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 111 days.

(21) Appl. No.: 16/038,363

(22) Filed: Jul. 18, 2018

(65) Prior Publication Data

US 2019/0154572 A1    May 23, 2019

(30) Foreign Application Priority Data

Nov. 20, 2017 (KR) .................. 10-2017-0154936

(51) Int. Cl.
*G01N 21/3581* (2014.01)
*C04B 111/27* (2006.01)

(52) U.S. Cl.
CPC ...... *G01N 21/3581* (2013.01); *C04B 2111/27* (2013.01)

(58) Field of Classification Search
None
See application file for complete search history.

(56) References Cited

U.S. PATENT DOCUMENTS

| 2009/0206263 A1* | 8/2009 | Rahman | ............ G01J 3/02 250/341.1 |
| 2017/0336261 A1* | 11/2017 | Fujihara | ............ G01J 3/42 |

* cited by examiner

*Primary Examiner* — Edwin C Gunberg
(74) *Attorney, Agent, or Firm* — Brinks Gilson & Lione (57) ABSTRACT

Disclosed are an apparatus and a method for a waterproofing test of a vehicle. The apparatus for a waterproofing test of a vehicle includes: a terahertz wave oscillating unit to oscillate a terahertz wave and irradiate the terahertz wave to a specific test part, a terahertz wave detecting unit to detect the terahertz wave reflected by the test part, and a control unit to determine whether water penetrated into the test part by comparing actual power of the terahertz detected by the terahertz wave detecting unit with a predetermined reference power.

13 Claims, 9 Drawing Sheets

APPARATUS AND METHOD FOR WATERPROOFING TEST OF VEHICLE

CROSS-REFERENCE TO RELATED APPLICATION

This application claims priority to and the benefit of Korean Patent Application No. 10-2017-0154936, filed on Nov. 20, 2017, the entire contents of which are incorporated herein by reference.

FIELD

The present disclosure relates to an apparatus and a method for a waterproofing test of a vehicle.

BACKGROUND

The statements in this section merely provide background information related to the present disclosure and may not constitute prior art.

In general, waterproofing tests are performed on vehicles in shower booths provided in manufacturing lines or other places. In a shower booth, water of high pressure is ejected to a vehicle and a waterproofing test is performed on the vehicle.

Conventionally, an operator directly observes a vehicle by naked eyes to carry out a waterproofing test of a vehicle through a method of recognizing whether the water ejected to the vehicle penetrates into the vehicle. However, in general, the water that penetrated into the vehicle gathers in external parts, such as apertures between a vehicle body frame and various interior materials covering the vehicle body frame, which is difficult to be observed. Accordingly, the conventional waterproofing test method is difficult to accurately test a waterproofing performance of a vehicle.

SUMMARY

The present disclosure provides an apparatus and a method for a waterproofing test of a vehicle, by which a waterproofing test performance of a vehicle may be improved to be accurately tested.

The present disclosure also provides an apparatus and a method for a waterproofing test of a vehicle, by which a waterproofing test performance of a vehicle may be improved in a state in which the vehicle is not destructed.

In accordance with an aspect of the present disclosure, an apparatus for a waterproofing test of a vehicle includes: a terahertz wave oscillating unit configured to oscillate a terahertz wave and irradiate the terahertz wave to a specific test part, a terahertz wave detecting unit configured to the terahertz wave reflected by the test part, and a control unit configured to determine whether water penetrated into the test part by comparing an actual power of the terahertz detected by the terahertz wave detecting unit with a predetermined reference power.

The predetermined reference power may be power of the terahertz wave reflected by a reference part which has the same stack structure as the test part and is in a state in which the water has not penetrated into the reference part.

The test part may be a specific part including: a vehicle body frame formed of a material that totally reflects the terahertz wave, and an interior material stacked to cover the vehicle body frame and formed of a material which the terahertz wave transmits by a specific ratio, and the terahertz wave oscillating unit may be configured to input the terahertz wave to the vehicle body frame through the interior material.

The control unit may track whether energy of the terahertz wave was absorbed by the water that penetrated into the test part while the terahertz wave irradiated to the test part is reflected by the test part, through comparison of the actual power with the predetermined reference power.

The control unit may control the terahertz wave oscillating unit such that a frequency of the terahertz wave is gradually converted within a specific terahertz frequency band.

The predetermined reference power is individually stored for a plurality of frequencies pertaining to the specific terahertz frequency band, and the control unit may compare the actual power with the predetermined reference power for the frequencies pertaining to the specific terahertz frequency band.

The control unit may determine that the water penetrated into the test part if the actual power is lower than the predetermined reference power by a specific ratio.

The terahertz wave oscillating unit may include a dual mode laser beam oscillator configured to generate and oscillate a pair of distributed feedback laser beams having different wavelengths, and a terahertz wave transmitter configured to receive the distributed feedback laser beams and generate and oscillate the terahertz wave.

The terahertz wave detecting unit may include a terahertz wave receiver configured to convert the terahertz wave reflected by the test part and perform oscillations.

The terahertz wave detecting unit may further include a signal amplifier configured to amplify the electrical signal and deliver the amplified electrical signal to the control unit.

In accordance with another aspect of the present disclosure, there is provided a method for a waterproofing test of a vehicle including the steps of: (a) irradiating, by a terahertz wave oscillating unit, a terahertz wave to a test part of the vehicle, and (b) determining, by a controller, whether water penetrated into the test part by comparing an actual power of the terahertz reflected by the test part with a specific reference power.

The method may further include the step of (c), before the step (a), irradiating the terahertz wave to a reference part which has the same stack structure as the test part and is in a state in which the water has not penetrated into the reference part and setting power of the terahertz wave reflected from the reference part as the reference power.

The test part may be a specific part including a vehicle body frame formed of a material that totally reflects the terahertz wave and an interior material stacked to cover the vehicle body frame and formed of a material which the terahertz wave transmits by a specific ratio, and the terahertz wave oscillating unit may be configured to input the terahertz wave to the vehicle body frame through the interior material.

The step (b) may be performed by tracking whether energy of the terahertz wave was absorbed by the water that penetrated into the test part while the terahertz wave irradiated to the test part is reflected by the test part, through comparison of the real power with the reference power The step (a) may be performed such that a frequency of the terahertz wave is gradually converted within a specific terahertz frequency band The reference power may be individually stored for a plurality of frequencies pertaining to the terahertz frequency band, and the step (b) may be performed by comparing the actual power with the reference power for the frequencies pertaining to the terahertz frequency band.

In the step (b), the water penetration into the test part is determined when the actual power is lower than the reference power by a specific ratio.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Figure 1:
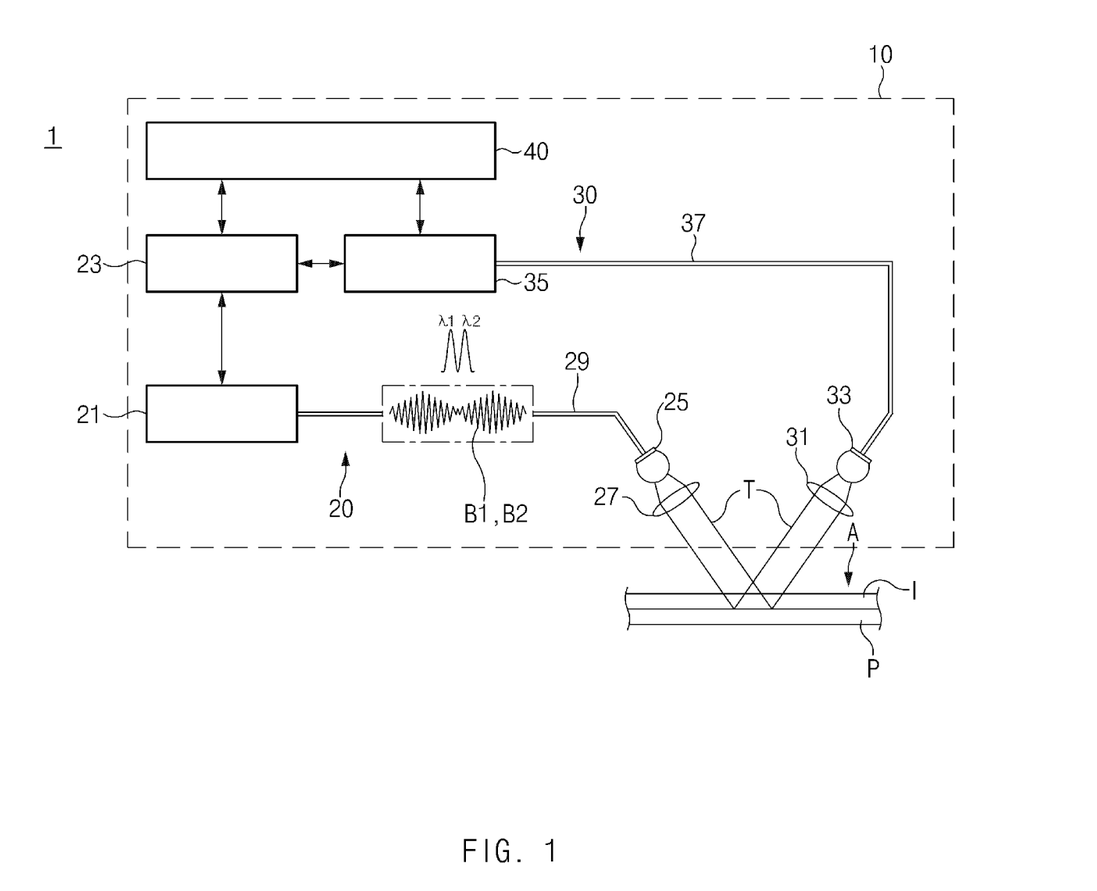
FIG. 1 is a concept view illustrating a schematic configuration of an apparatus for a waterproofing test of a vehicle.
Figure 2:
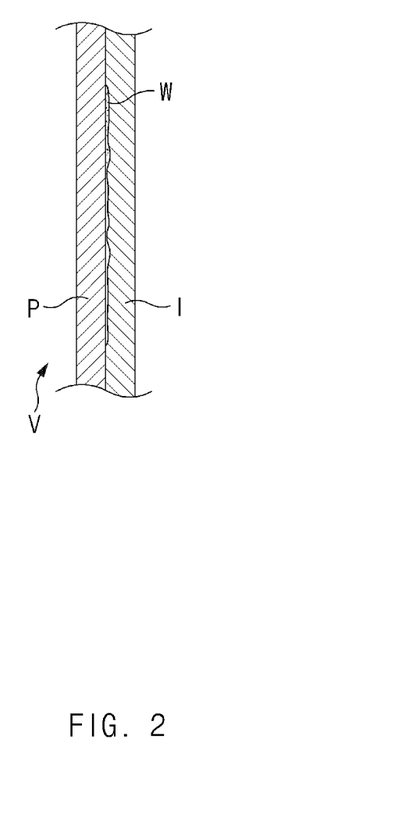
FIG. 2 is a view illustrating a state in which water penetrates into a vehicle.
Figure 3:
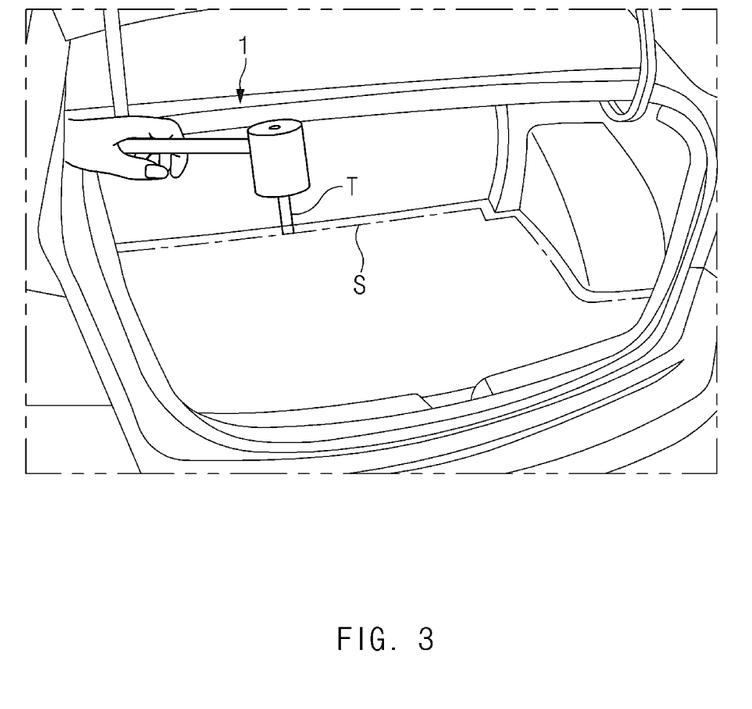
FIG. 3 is a view illustrating a main waterproofing test target part of a vehicle.

FIG. 1 is a concept view illustrating a schematic configuration of an apparatus for a waterproofing test of a vehicle according to one form of the present disclosure. FIG. 2 is a view illustrating a state in which water penetrates into a vehicle. FIG. 3 is a view illustrating a main waterproofing test target part of a vehicle.

Referring to FIG. 1, an apparatus 1 for a waterproofing test of a vehicle may include a body 10 that provides an installation space, for example, a power source and analysis equipment that are desired for a waterproofing test, a terahertz wave oscillation unit 20 that generates a terahertz wave and irradiates the generated terahertz wave to a specific test part A, and a control unit 40 that compares power of the terahertz waves detected by the terahertz wave detecting unit 30 and specific reference power Pr to determine whether water W penetrates into the test part A.

The apparatus 1 for a waterproofing test of a vehicle may carry out a waterproofing test of a vehicle by irradiating a terahertz wave T to a specific test part A of the vehicle and tracking reflection, transmission and absorption of the terahertz wave T generated in the test part A.

Referring to FIG. 2, when the waterproofing performance of the vehicle is abnormal, the water that penetrated into the vehicle from the outside gathers in an aperture between a vehicle body frame P, such as a dash panel, a roof panel, or a side assembly panel, and an interior material I or an aperture between the interior materials I while flowing along the body frame P. Here, the interior material I refers to a protective layer that is stacked on the vehicle body frame P to cover the vehicle body frame P.

In general, the vehicle body frame P is mainly formed of a conductive material, such as a metallic material, which totally reflects a terahertz wave, and the interior material I is mainly formed of a nonconductive material, such as a synthetic resin, which transmits a terahertz wave at a specific ratio. Accordingly, if a terahertz wave T is irradiated to a specific part of the vehicle, which is configured such that the vehicle body frame P and the interior material I are stacked, the terahertz wave T mainly transmits the interior material I and the terahertz wave T mainly is reflected by the vehicle body frame P. Accordingly, if the terahertz wave T is oscillated such that the terahertz wave T is irradiated to one surface of the interior material I, the terahertz wave T irradiated to the one surface of the interior material I passes through the interior material I to be input to the body frame and the terahertz wave T input to the one surface of the body frame P is emitted to the outside of the interior material I after being reflected by the vehicle body frame P and transmitting the interior material I again.

However, the water has a property of absorbing energy of the terahertz wave. Accordingly, the apparatus 1 for a waterproofing test of a vehicle may test the waterproofing performance of the vehicle by irradiating a terahertz wave T to the specific part V and tracking generation of an energy absorption phenomenon for the terahertz wave of the water at the specific part V. In one form, as illustrated in FIG. 3, the apparatus 1 for a waterproofing test of a vehicle may test the waterproofing performance of the vehicle by selectively irradiating a terahertz wave according to a main part S in which the water that penetrated into the vehicle from the outside due to a structural cause, such as an inclination angle, is expected to gather. The method for a waterproofing test of a vehicle by using a phenomenon of absorbing energy of a terahertz wave of water will be described below in more detail.

Figure 4:
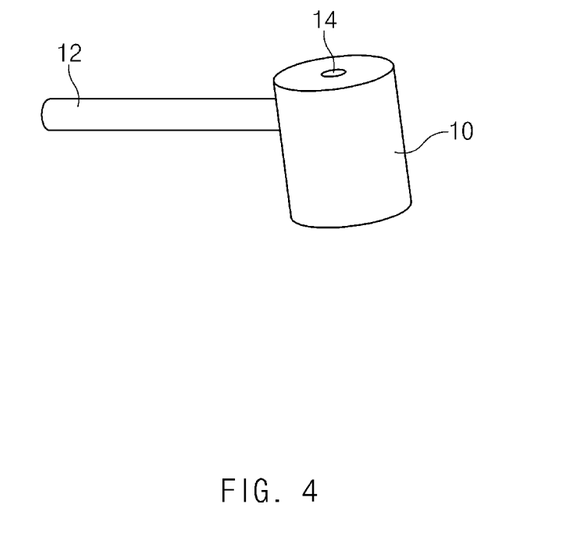
FIG. 4 is a perspective view of an apparatus for a waterproofing test illustrated in FIG. 1.

FIG. 4 is a perspective view of an apparatus for a waterproofing test illustrated in FIG. 1.

First, the body 10 provides an installation space for general elements of the apparatus 1 for a waterproofing test of a vehicle. As illustrated in FIG. 4, the body 10 may have a cylindrical shape but the present disclosure is not limited thereto.

The body 10 may include a handle 12 for gripping the apparatus 1 for a waterproofing test, a display member 14 that displays a waterproofing test result, and a battery (not illustrated) that provides electric power for driving the apparatus 1 for a waterproofing test. The kind of the display member 14 is not specifically limited. For example, the display member 14 may be an alarm, a warning lamp, or a display.

Figure 5:
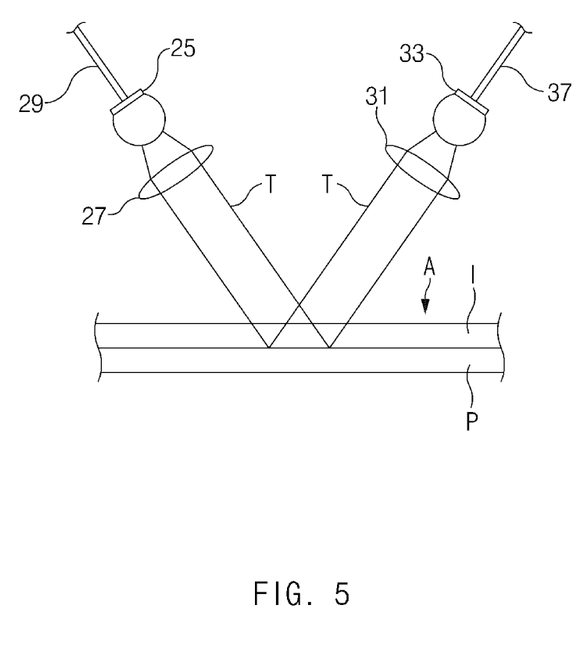
FIG. 5 is a view illustrating a state in which a terahertz wave is reflected from a text part when water does not penetrate into the test part.
Figure 6:
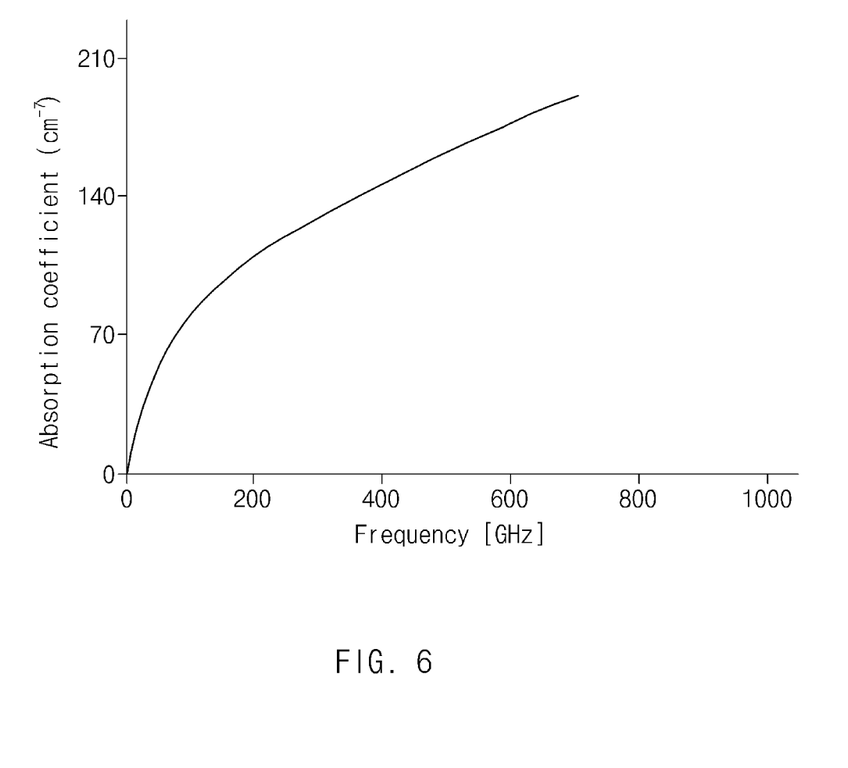
FIG. 6 is a graph depicting terahertz energy absorption features of water.
Figure 7:
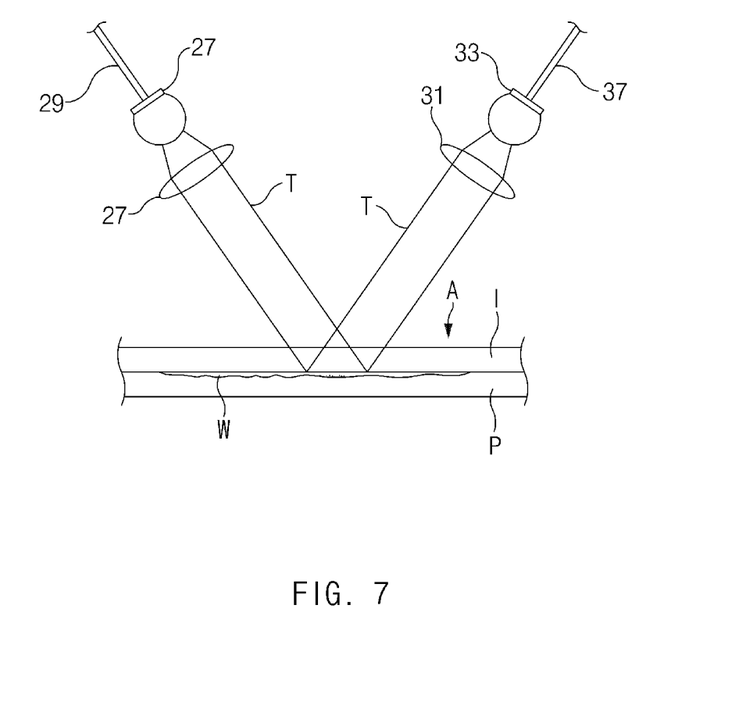
FIG. 7 is a view illustrating a state in which a terahertz wave is reflected from a text part when water penetrates into the test part.

FIG. 5 is a view illustrating a state in which a terahertz wave is reflected from a text part when water does not penetrate into the test part. FIG. 6 is a graph depicting terahertz energy absorption features of water. FIG. 7 is a view illustrating a state in which a terahertz wave is reflected from a text part when water penetrates into the test part.

Next, the terahertz wave oscillating unit 20 is configured to generate a terahertz wave T and irradiate the generated terahertz wave T to a specific test part A. The test part A may be a specific part V of the vehicle including the vehicle body frame P formed of a conductive material that may totally reflect a terahertz wave T and the interior material I stacked to cover the vehicle body frame P and formed of a nonconductive material that may transmit the terahertz T at a specific ratio, but the present disclosure it not limited thereto. Here, the number of stacked interior materials I is not specifically limited, and one or more interior materials I may be sequentially stacked on the vehicle body frame P.

The structure of the terahertz wave oscillating unit 20 is not specifically limited. For example, as illustrated in FIG. 1, the terahertz wave oscillating unit 20 may include a dual mode laser beam oscillator 21 that generates and oscillates a pair of distributed feedback lasers B1 and B2, a signal modulator 23 that outputs a modulation signal for eliminating noise included in a terahertz wave T, a terahertz wave emitting element 25 that receives the distributed feedback laser beams B1 and B2 oscillated by the dual mode laser beam oscillator 21, and a condensing lens that condenses the terahertz wave T oscillated by the terahertz wave emitting element 25 and irradiates the condensed terahertz wave T to a test part A.

As illustrated in FIG. 1, the dual mode laser beam oscillator 21 generates a pair of distributed feedback laser beams B1 and B2 having different wavelengths $\lambda 1$ and $\lambda 2$, and beats and oscillates the generated distributed feedback laser beams B1 and B2.

However, the frequency of the electromagnetic wave generated by the terahertz wave emitting element 25 is proportional to a difference between the wavelength $\lambda 1$ of one B1 of the distributed feedback laser beams and the wavelength $\lambda 2$ of the other distributed feedback laser beam B2. Accordingly, the dual mode laser beam oscillator 21 is configured to selectively change the wavelength $\lambda 1$ or $\lambda 2$ of at least one of the distributed feedback laser beams B1 and B2 such that the frequency of the electromagnetic wave generated by the terahertz wave emitting element 25 pertains to a terahertz frequency band. The dual mode laser beam oscillator 21 may selectively adjust the frequency of the terahertz wave T generated by the terahertz wave emitting element 25 by selectively changing the wavelength $\lambda 1$ or $\lambda 2$ of the at least one of the distributed feedback laser beams B1 and B2. The technology of selectively changing the frequency of the terahertz wave T by using the dual mode laser beam oscillator 21 is a technology that is generally used in the terahertz wave field, and a detailed description thereof will be omitted.

As illustrated in FIG. 1, the distributed feedback laser beams B1 and B2 beaten and oscillated by the dual mode laser beam oscillator 21 may be delivered to the terahertz wave emitting element 25 through a waveguide 29 configured to connect the dual mode laser beam oscillator 21 and the terahertz wave emitting element 25. Meanwhile, the present disclosure is not limited thereto, and the distributed feedback laser beams B1 and B2 may be delivered to the terahertz wave emitting element 25 by a light path converting member, such as at least one reflector, which is installed between the dual mode laser beam oscillator 21 and the terahertz wave emitting element 25.

The signal modulator 23 may generate a modulation signal for eliminating noise included in the terahertz wave T and deliver the generated modulation signal to the terahertz wave emitting element 25 and a signal amplifier 35 of the terahertz wave detecting unit 30, which will be described below. According to the signal modulator 23, the terahertz wave emitting element 25 may generate and oscillate the terahertz wave T modulated by a modulation signal, and may eliminate noise included in the terahertz wave T reflected by the test part A by using the modulation signal directly received from the signal modulator 23. The technology of eliminating noise of an electromagnetic wave by using the modulation signal is a technology generally used in the electromagnetic wave field, and a detailed description thereof will be omitted.

The terahertz wave emitting element 25 generates and oscillates a terahertz wave T that is proportional to a difference between the wavelengths of the distributed feedback laser beams B1 and B2 by using the distributed feedback laser beams B1 and B2 delivered through the waveguide 29 in a beaten state and a DC bias applied to the terahertz wave emitting element 25.

In more detail, the terahertz wave emitting element 25 is configured to generate an electron-hole pair in a photoconductive thin film (not illustrated) if the beaten distributed feedback laser beams B1 and B2 is input between the antenna electrodes (not illustrated), to which a DC bias of −5 V to −1 V is applied. Then, when the beaten distributed feedback laser beams B1 and B2 are delivered from the terahertz wave emitting element 25, a photocurrent is generated while the photons move to an electrode (not illustrated) by the DC bias. The photocurrent flows for extremely short time, and an electromagnetic wave is formed by a change of a photocurrent. However, when a movement time of the photon is short enough to reach a picosecond level, the electromagnetic wave becomes a terahertz wave T. The technology of generating the terahertz wave T is a technology generally used in the terahertz wave field, and a detailed description thereof will be omitted.

The condensing lens 27 is installed to be located on a light path of the terahertz wave T oscillated by the terahertz wave emitting element 25. The kind of the condensing lens 27 is not specifically limited. For example, as illustrated in FIG. 5, the condensing lens 27 may be a collimation lens that may convert the terahertz wave T oscillated by the terahertz wave emitting element 25 into parallel light. In one form, the condensing lens 27 is installed such that the terahertz wave T is input to a test part A. Then, as illustrated in FIG. 5, the terahertz wave T may be reflected from the test part A at an angle corresponding to the incident angle.

In more detail, the condensing lens 27 may be installed such that the terahertz wave T is input to one surface of the interior material I at an acute angle. Then, any portion of the terahertz wave T is reflected by a surface of the interior material I, and the remaining portions of the terahertz wave T transmits the interior material I and enters the interior of the test part A. The terahertz wave T input to one surface of the vehicle body frame P transmits the interior material I after being reflected at a reflection angle corresponding to the incident angle, is emitted to the outside of the test part A through one surface of the interior material I, and proceeds toward the terahertz wave detecting unit 30, which will be described below.

Figure 8:
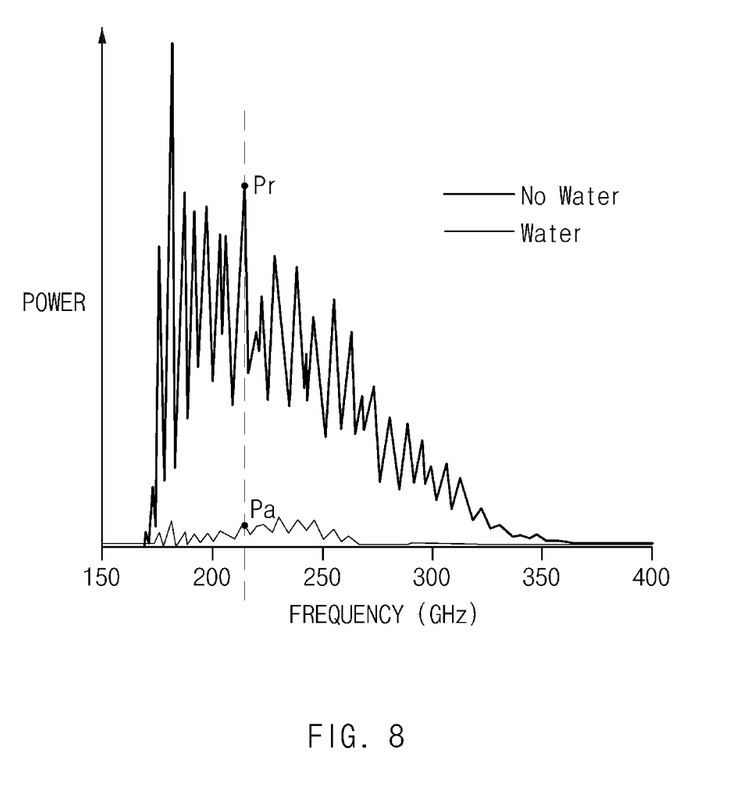
FIG. 8 is a graph depicting a frequency spectrum of a terahertz wave detected by a terahertz wave detecting unit.

However, when water W penetrates into the test part A, the terahertz wave T is reflected or absorbed by the water that penetrated into the test part A. Here, the water W that penetrated into the test part A refers to water that penetrated into the vehicle from the outside due to an abnormality of the waterproofing performance of the vehicle and gathered in the interior of the test part A. As illustrated in FIG. 6, the energy absorption coefficient α of the water for the terahertz wave gradually increases as the frequency of the terahertz wave increases. Further, as represented in Equation 1, the energy of the terahertz wave is absorbed by the water at a higher rate as the product of the energy absorption coefficient α and a distance z by which the terahertz wave passes through the water.

$$V = V_0 e^{-\alpha z} \quad \text{[Equation 1]}$$

where, V0: Energy of a terahertz wave before the terahertz wave passes through water;

V: Energy of a terahertz wave after the terahertz wave passes through water;

α: Energy absorption coefficient of water for the terahertz wave; and z: Distance by which the terahertz wave passes water Accordingly, when water W penetrates into the test part A, most of the energy of the terahertz wave T is absorbed by the water that penetrated into the test part A. For example, when the thickness of the water W that penetrated into the test part A is about 1 mm and the frequency of the terahertz wave T is 0.2 THz, the energy of the terahertz wave T that passed through the test part A decreases to $\frac{1}{1,000,000}$. Accordingly, when the water penetrates into the test part A, most of the terahertz wave T is absorbed by the water W and only a portion of the terahertz wave T is reflected by the interior material I, the water W, and the vehicle body frame P and then proceeds toward the terahertz wave detecting unit 30, which will be described below. Accordingly, as illustrated in FIGS. 7 and 8, when the water W penetrates into the test part A, only the terahertz wave T of a remarkably small light quantity may reach the terahertz wave detecting unit 30 after being reflected by the test part A as compared with the case in which the water has not penetrate into the test part A.

Next, the terahertz wave detecting unit 30 is configured to detect the terahertz wave T reflected by the test part A.

The structure of the terahertz wave detecting unit 30 is not specifically limited. For example, as illustrated in FIG. 1, the terahertz wave detecting unit 30 include a condensing lens 31 configured to condense the terahertz wave T reflected by the test part A, a terahertz wave receiving element 33 that changes the terahertz wave T condensed by the condensing lens 31 to an electrical signal, and a signal amplifier 35 that amplifies the electrical signal received from the terahertz wave receiving element 33 and delivers the amplified electrical signal to the control unit 40.

As illustrated in FIG. 7, the condensing lens 31 is installed to be located on a light path of the terahertz wave T reflected by the test part A in consideration of the reflection angle by which the terahertz wave T is reflected by the test part A. The kind of the condensing lens 31 is not specifically limited. For example, the condensing lens 31 may be a convex lens having a specific focus.

As illustrated in FIG. 7, the terahertz wave receiving element 33 is installed to be located at the focus of the terahertz wave T. The terahertz wave receiving element 33 generates and oscillates an electrical signal corresponding top the terahertz wave T by using the terahertz wave T condensed by the condensing lens 31.

In more detail, the terahertz wave receiving element 33 is configured such that an electron-hole is generated in a photoconductive thin film (not illustrated). If the terahertz wave T is input to the terahertz wave receiving element 33, a photocurrent, that is, an electrical signal corresponding to the terahertz wave T is generated while photons are moved to an electrode by the electromagnetic field of the terahertz wave T. The technology of generating an electrical signal corresponding to the terahertz wave T is a technology generally used in the terahertz wave field, and a detailed description thereof will be omitted.

As illustrated in FIG. 1, the electrical signal oscillated by the terahertz wave receiving element 33 may be delivered to the signal amplifier 35 by the waveguide 37 configured to connect the terahertz wave receiving element 33 and the signal amplifier 35.

The signal amplifier 35 amplifies the electrical signal delivered through the waveguide 37 by a specific amplification ratio, and eliminates noise included in the electrical signal by using the modulation signal delivered from the signal modulator 23 and delivers the electrical signal to the control unit 40.

FIG. 8 is a graph depicting a frequency spectrum of a terahertz wave detected by a terahertz wave detecting unit.

Next, the control unit 40 is configured to control overall driving of the apparatus 1 for a waterproofing test. Further, the control unit 40 may be connected to an external device through wired/wireless communication. Accordingly, the control unit 40 may control driving of the apparatus 1 for a waterproofing test based on the control signal transmitted from the external device or transmit the waterproofing test result of the vehicle to the external device.

Meanwhile, the change of the electrical signal oscillated by the terahertz wave receiving element 33 represents a change of an electromagnetic field of the terahertz wave T. Accordingly, as illustrated in FIG. 8, the control unit 40 may test the waterproofing performance of the vehicle with reference to whether the water W penetrated into the test part A through an analysis of a frequency spectrum of the terahertz wave T after deriving the frequency spectrum of the terahertz wave T from the electrical signal delivered from the signal amplifier 35. For example, the control unit 40 may determine that the waterproofing performance of the vehicle is normal if it is determined that the water W has not penetrated into the test part A, and may determine that the waterproofing performance of the vehicle is abnormal if it is determined that the water W penetrated into the test part A.

The method for analyzing the frequency spectrum of the terahertz wave T is not specifically limited.

For example, the control unit 40 may determine whether the water W penetrated into the test part A by comparing power (hereinafter, referred to as 'real power Pa') of the terahertz wave T of a specific frequency detected by the terahertz wave detecting unit 30 and reference power Pr of the terahertz T of the specific frequency stored in advance. The reference power Pr refers to power of the terahertz wave T obtained by irradiating the terahertz wave T of the specific frequency and detecting the terahertz wave T reflected from the reference part by using the terahertz wave detecting unit 30.

The control unit 40 may determine whether the water W penetrated into the test part A by tracking whether the energy of the terahertz wave T was absorbed by the water W that penetrated into the test part A, through the comparison of the real power Pa and the reference power Pr. For example, the control unit 40 may determine that the energy of the terahertz T is absorbed by the water W that penetrated into the test part A if the actual power Pa is lower than the reference power Pr by a specific ratio as in Equation 2, and may determine that the waterproofing performance of the vehicle is abnormal. Further, the control unit 40 may determine that the energy of the terahertz T is not absorbed by the water W that penetrated into the test part A if the actual power Pa is not lower than the reference power Pr by a specific ratio as in Equation 2, and may determine that the waterproofing performance of the vehicle is normal.

$$\beta > \frac{Pa}{Pr}, (0 < \beta < 1) \quad \text{[Equation 2]}$$

Meanwhile, if the waterproofing performance of the vehicle is tested only through the comparison of the actual power Pa and the reference power Pr for a single frequency, an error may be generated in the test result of the waterproofing performance of the vehicle due to noise and the like included in the terahertz wave T. To solve this, the reference power Pr may be individually measured for frequencies pertaining to a specific frequency band and may be stored. Further, the control unit 40 may control the terahertz wave oscillating unit 20 such that the frequency of the terahertz wave T gradually changes within a specific frequency band, and may compare the actual power Pa and the reference power Pr for a plurality of frequencies pertaining to the specific frequency band. Then, because the comparison result of the actual power Pa and the reference power Pr for the plurality of frequencies may be acquired, an error may be prevented from being generated in the waterproofing test result of the vehicle due to noise included in the terahertz wave T and other causes.

The apparatus for a waterproofing test of a vehicle may carry out a waterproofing test of the vehicle over the inside and the outside of the test part A by using the transmission property of the terahertz wave T. Accordingly, because the apparatus 1 for a waterproofing test may easily detect even the water that penetrated into a part which is difficult to be observed from the outside, such as an aperture between the vehicle body frame P and the interior material I, the accuracy of the waterproofing test may be improved. Further, the apparatus 1 for a waterproofing test may test the waterproofing performance of the vehicle in a state in which the vehicle is not destructed without having to disassembling the vehicle. Accordingly, the apparatus 1 for a waterproofing test of a vehicle may reduce a time for the waterproofing test, and may prevent the vehicle from being secondarily damaged in a process of disassembling and assembling the vehicle for the waterproofing test.

Figure 9:
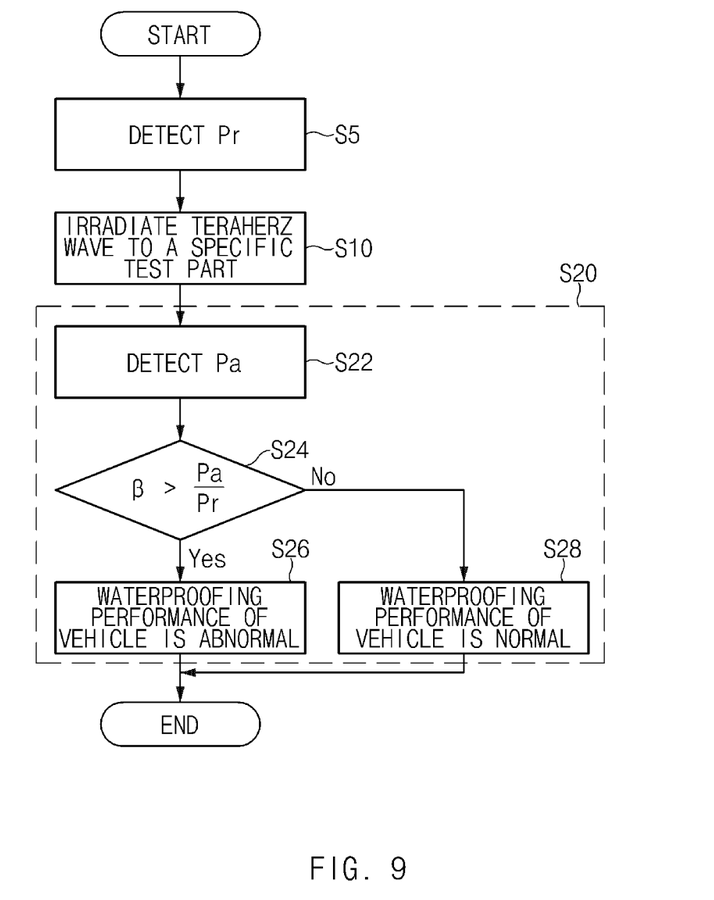
FIG. 9 is a view illustrating a method for a waterproofing test.

FIG. 9 is a view illustrating a method for a waterproofing test according to another form of the present disclosure.

The method for a waterproofing test according to another form of the present disclosure may include an operation of irradiating a terahertz wave T to a specific test part A of the vehicle (S10), and an operation of comparing actual power Pa of the terahertz wave T reflected by the test part A and reference power Pr stored in advance to determine whether the water W penetrated into the test part A (S20).

First, operation S10 may be performed by irradiating the terahertz wave T generated by changing a pair of distributed feedback laser beams B1 and B2 beaten and oscillated by the dual mode laser beam oscillator 21 to the test part A. The test part A may be a specific part V of the vehicle including the vehicle body frame P formed of a conductive material that may totally reflect a terahertz wave T and the interior material I stacked to cover the vehicle body frame P and formed of a nonconductive material that may transmit the terahertz T at a specific ratio, but the present disclosure it not limited thereto. In operation S10, the control unit 40 may control the terahertz wave oscillating unit 20 such that the frequency of the terahertz wave T is gradually changed within a specific terahertz frequency, and the terahertz wave oscillating unit 20 may irradiate the terahertz wave T to the test part A such that the terahertz wave T is input to the vehicle body frame P after transmitting the interior material I.

Thereafter, operation S20 may be carried out by measuring the actual power Pa of the terahertz wave T reflected from the test part A in operation S10 (S22) and comparing the actual power Pa and the reference power Pr (S24). In operation S20, the control unit 40 may determine that the water W penetrated into the test part A if the actual power Pa is lower than the reference power Pr by a specific ratio, and may determine that the waterproofing performance of the vehicle is abnormal (S26). In operation S20, the control unit 40 may determine that the water W has not penetrated into the test part A if the actual power Pa is not lower than the reference power Pr by a specific ratio, and may determine that the waterproofing performance of the vehicle is normal (S28). In operation S20, the control unit 40 compares the actual power Pa and the reference power Pr for the plurality of frequencies pertaining to the terahertz frequency band.

Meanwhile, as illustrated in FIG. 9, the method for a waterproofing test according to another form of the present disclosure may further include an operation of storing the reference power Pr before performance of operation S10 (S5). Operation S5 may be carried out by irradiating the terahertz wave T to a reference part of the vehicle which has the same stack structure as the test part A and into which the water W has not penetrated, and storing the power of the terahertz wave T reflected by the reference part as the reference power Pr. Then, the control unit 40 individually measures the reference power Pr for the plurality of frequencies pertaining to the terahertz frequency band and stores the measured reference power Pr.

The present disclosure relates to an apparatus and a method for a waterproofing test of a vehicle, and has the following effects.

First, the present disclosure may improve the accuracy of a waterproofing test because even the water that penetrated into the interior of the test part such that it is difficult to observe the water from the outside may be easily detected by using the transmission property of the terahertz wave.

Accordingly, the present disclosure may reduce a time for the waterproofing test, and may prevent the vehicle from being secondarily damaged in a process of disassembling and assembling the vehicle for the waterproofing test because the waterproofing performance of the vehicle may be tested in a state in which the vehicle is not destructed.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed forms of the present disclosure do not limit the technical spirit of the present disclosure but are illustrative, and the scope of the technical spirit of the present disclosure is not limited by the forms of the present disclosure. It will be understood that all the technical spirits within the equivalent range fall within the scope of the present disclosure.

What is claimed is:

1. An apparatus for a waterproofing test of a vehicle, the apparatus comprising:
    a terahertz wave oscillating unit configured to oscillate a terahertz wave and irradiate the terahertz wave to a test part of the vehicle;
    a terahertz wave detecting unit configured to detect the terahertz wave reflected by the test part; and
    a control unit configured to:
        determine whether water penetrated into the test part by comparing an actual power of the terahertz wave detected by the terahertz wave detecting unit with a predetermined reference power, and
        gradually convert a frequency of the terahertz wave within a specific terahertz frequency band by controlling the terahertz wave oscillating unit,
    wherein:
        the predetermined reference power is individually stored for a plurality of frequencies pertaining to the specific terahertz frequency band, and
        the control unit is configured to compare the actual power with the predetermined reference power for the plurality of frequencies pertaining to the specific terahertz frequency band to inhibit errors caused by noise.

2. The apparatus of claim 1, wherein the predetermined reference power is power of a terahertz wave reflected by a reference part which has the same stack structure as the test part and is in a state in which the water has not penetrated into the reference part.

3. The apparatus of claim 1, wherein the test part is a specific part including: a vehicle body frame formed of a material that totally reflects the terahertz wave, and an interior material stacked to cover the vehicle body frame and formed of a material which the terahertz wave transmits by a specific ratio, and
    wherein the terahertz wave oscillating unit is configured to input the terahertz wave to the vehicle body frame through the interior material.

4. The apparatus of claim 3, wherein the control unit tracks whether energy of the terahertz wave was absorbed by the water that penetrated into the test part while the terahertz wave irradiated to the test part is reflected by the test part, through comparison of the actual power with the predetermined reference power.

5. The apparatus of claim 1, wherein the control unit determines that the water penetrated into the test part if the actual power is lower than the predetermined reference power by a specific ratio.

6. The apparatus of claim 1, wherein the terahertz wave oscillating unit includes:
    a dual mode laser beam oscillator configured to generate and oscillate a pair of distributed feedback laser beams having different wavelengths; and
    a terahertz wave transmitter configured to receive the distributed feedback laser beams and generate and oscillate the terahertz wave.

7. The apparatus of claim 6, wherein the terahertz wave detecting unit includes:
    a terahertz wave receiver configured to convert the terahertz wave reflected by the test part to an electrical signal and oscillate the electrical signal.

8. The apparatus of claim 7, wherein the terahertz wave detecting unit further includes:
    a signal amplifier configured to amplify the electrical signal and deliver the amplified electrical signal to the control unit.

9. A method for a waterproofing test of a vehicle, the method comprising the steps of:
    (a) irradiating, by a terahertz wave oscillating unit, a terahertz wave to a test part of the vehicle; and
    (b) determining, by a controller, whether water penetrated into the test part by comparing an actual power of the terahertz wave reflected by the test part with a reference power,
    wherein:
        the step (a) includes gradually converting a frequency of the terahertz wave within a specific terahertz frequency band,
        the reference power is individually stored for a plurality of frequencies pertaining to the terahertz frequency band, and
        the step (b) is performed by comparing the actual power with the reference power for the plurality of frequencies pertaining to the terahertz frequency band to inhibit errors caused by noise.

10. The method of claim 9, further comprising the step of:
    (c) before the step (a), irradiating the terahertz wave to a reference part which has the same stack structure as the test part and is in a state in which the water has not penetrated into the reference part, and setting power of the terahertz wave reflected from the reference part as the reference power.

11. The method of claim 9, wherein the test part is a specific part including: a vehicle body frame formed of a material that totally reflects the terahertz wave, and an interior material stacked to cover the vehicle body frame and formed of a material which the terahertz wave transmits by a specific ratio, and
    wherein the step (a) is performed to input the terahertz wave to the vehicle body frame through the interior material.

12. The method of claim 9, wherein the step (b) is performed by tracking whether energy of the terahertz wave was absorbed by the water that penetrated into the test part while the terahertz wave irradiated to the test part is reflected by the test part, through comparison of the actual power with the reference power.

13. The method of claim 9, wherein in the step (b) the water penetration into the test part is determined when the actual power is lower than the reference power by a specific ratio.

* * * * *